(12) United States Patent
Bookbinder et al.

(10) Patent No.: US 9,617,180 B2
(45) Date of Patent: Apr. 11, 2017

(54) METHODS AND APPARATUSES FOR FABRICATING GLASS ARTICLES

(71) Applicant: Corning Incorporated, Corning, NY (US)

(72) Inventors: Dana Craig Bookbinder, Corning, NY (US); Albert Roth Nieber, Painted Post, NY (US); Stephan Lvovich Logunov, Corning, NY (US); Pushkar Tandon, Painted Post, NY (US); Sergio Tsuda, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/795,345

(22) Filed: Jul. 9, 2015

(65) Prior Publication Data

US 2016/0009585 A1    Jan. 14, 2016

Related U.S. Application Data

(60) Provisional application No. 62/024,093, filed on Jul. 14, 2014.

(51) Int. Cl.

| | |
|---|---|
| *C03B 9/12* | (2006.01) |
| *C03B 13/04* | (2006.01) |
| *C03B 9/42* | (2006.01) |
| *C03B 21/04* | (2006.01) |
| *B23K 26/382* | (2014.01) |
| *B23K 26/402* | (2014.01) |
| *B23K 26/06* | (2014.01) |
| *C03B 33/04* | (2006.01) |
| *B23K 26/0622* | (2014.01) |
| *B23K 26/073* | (2006.01) |
| *B23K 26/08* | (2014.01) |
| *B23K 26/10* | (2006.01) |
| *B23K 26/38* | (2014.01) |
| *C03B 33/02* | (2006.01) |
| *B23K 103/00* | (2006.01) |
| *C03B 33/09* | (2006.01) |
| *B23K 101/04* | (2006.01) |

(52) U.S. Cl.
CPC ............ *C03B 9/12* (2013.01); *B23K 26/0624* (2015.10); *B23K 26/0648* (2013.01); *B23K 26/0652* (2013.01); *B23K 26/0738* (2013.01); *B23K 26/0838* (2013.01); *B23K 26/103* (2013.01); *B23K 26/38* (2013.01); *B23K 26/382* (2015.10); *B23K 26/402* (2013.01); *C03B 9/42* (2013.01); *C03B 13/04* (2013.01); *C03B 21/04* (2013.01); *C03B 33/0222* (2013.01); *C03B 33/04* (2013.01); *B23K 2201/04* (2013.01); *B23K 2203/54* (2015.10); *C03B 33/091* (2013.01)

(58) Field of Classification Search
CPC .......... C03B 9/12; C03B 21/04; B23K 26/402
USPC .......................................................... 65/67
See application file for complete search history.

(56) References Cited

U.S. PATENT DOCUMENTS

| | | |
|---|---|---|
| 1,790,397 A | 1/1931 | Woods et al. |
| 3,647,410 A | 3/1972 | Heaton et al. |
| 3,729,302 A * | 4/1973 | Heaton ............... C03B 9/12 |
| | | 65/105 |
| 3,775,084 A | 11/1973 | Heaton |
| 4,646,308 A | 2/1987 | Kafka et al. |
| 4,764,930 A | 8/1988 | Bille et al. |
| 4,907,586 A | 3/1990 | Bille et al. |
| 4,918,751 A | 4/1990 | Pessot et al. |
| 5,040,182 A | 8/1991 | Spinelli et al. |
| 5,265,107 A | 11/1993 | Delfyett, Jr. |
| 5,400,350 A | 3/1995 | Galvanauskas |
| 5,436,925 A | 7/1995 | Lin et al. |
| 5,553,093 A | 9/1996 | Ramaswamy et al. |
| 5,586,138 A | 12/1996 | Yokoyama |
| 5,696,782 A | 12/1997 | Harter et al. |
| 5,736,709 A | 4/1998 | Neiheisel |
| 5,776,220 A | 7/1998 | Allaire et al. |
| 6,016,324 A | 1/2000 | Rieger et al. |
| 6,038,055 A | 3/2000 | Hansch et al. |
| 6,055,829 A | 5/2000 | Witzmann et al. |

(Continued)

FOREIGN PATENT DOCUMENTS

| | | |
|---|---|---|
| CN | 102672355 A | 9/2012 |
| CN | 102672355 B | 5/2015 |

(Continued)

OTHER PUBLICATIONS

"EagleEtch—The Anti-glare Glass for Technical Display Applications", EuropTec USA Inc., www.EuropTecUSA.com' 8 pages.

(Continued)

*Primary Examiner* — Mark Halpern
(74) *Attorney, Agent, or Firm* — Michael G. Panian; Svetlana Z. Short

(57) ABSTRACT

Methods of fabricating formed glass articles are described herein. In one embodiment, a method for fabricating a formed glass article may include forming a glass ribbon, forming a parison, and shaping the parison to form a glass article. The glass article may be attached to the glass ribbon at an attachment region defining an edge of the glass article. The process may also include contacting the attachment region with a focal line of a laser beam and separating the glass article from the glass ribbon at the attachment region. The attachment region may be perforated by the laser beam and the focal line may be substantially perpendicular to the plane of the glass ribbon.

22 Claims, 4 Drawing Sheets

(56) References Cited

U.S. PATENT DOCUMENTS

| | | | |
|---|---|---|---|
| 6,078,599 | A | 6/2000 | Everage et al. |
| 6,156,030 | A | 12/2000 | Neev |
| 6,160,835 | A | 12/2000 | Kwon |
| 6,210,401 | B1 | 4/2001 | Lai |
| 6,256,328 | B1 | 7/2001 | Delfyett et al. |
| 6,272,156 | B1 | 8/2001 | Reed et al. |
| 6,339,208 | B1 | 1/2002 | Rockstroh et al. |
| 6,373,565 | B1 | 4/2002 | Kafka et al. |
| 6,381,391 | B1 | 4/2002 | Islam et al. |
| 6,396,856 | B1 | 5/2002 | Sucha et al. |
| 6,407,360 | B1 | 6/2002 | Choo et al. |
| 6,438,996 | B1 | 8/2002 | Cuvelier |
| 6,445,491 | B2 | 9/2002 | Sucha et al. |
| 6,449,301 | B1 | 9/2002 | Wu et al. |
| 6,484,052 | B1 | 11/2002 | Visuri et al. |
| 6,489,589 | B1 | 12/2002 | Alexander |
| 6,501,578 | B1 | 12/2002 | Bernstein et al. |
| 6,552,301 | B2 | 4/2003 | Herman et al. |
| 6,573,026 | B1 | 6/2003 | Aitken et al. |
| 6,729,161 | B1 | 5/2004 | Miura et al. |
| 6,992,026 | B2 | 1/2006 | Fukuyo et al. |
| 7,353,829 | B1 | 4/2008 | Wachter et al. |
| 8,916,798 | B2 | 12/2014 | Plüss |
| 2002/0046997 | A1 | 4/2002 | Nam et al. |
| 2003/0006221 | A1 | 1/2003 | Hong et al. |
| 2005/0024743 | A1 | 2/2005 | Camy-Peyret |
| 2005/0098548 | A1 | 5/2005 | Kobayashi et al. |
| 2006/0109874 | A1 | 5/2006 | Shiozaki et al. |
| 2007/0021548 | A1 | 1/2007 | Hattori et al. |
| 2008/0000884 | A1 | 1/2008 | Sugiura et al. |
| 2010/0086741 | A1 | 4/2010 | Bovatsek et al. |
| 2010/0089882 | A1 | 4/2010 | Tamura |
| 2010/0252540 | A1 | 10/2010 | Lei et al. |
| 2010/0252959 | A1 | 10/2010 | Lei et al. |
| 2012/0196071 | A1 | 8/2012 | Cornejo et al. |
| 2012/0234807 | A1* | 9/2012 | Sercel ............... B23K 26/0608 219/121.69 |
| 2012/0255935 | A1 | 10/2012 | Kakui et al. |
| 2013/0068736 | A1 | 3/2013 | Mielke et al. |
| 2013/0126573 | A1 | 5/2013 | Hosseini et al. |
| 2013/0323469 | A1 | 12/2013 | Abramov et al. |
| 2014/0199519 | A1 | 7/2014 | Schillinger et al. |
| 2015/0158120 | A1 | 6/2015 | Courvoisier et al. |

FOREIGN PATENT DOCUMENTS

| | | |
|---|---|---|
| DE | 102012110971 A1 | 5/2014 |
| EP | 0609978 A1 | 8/1994 |
| EP | 2754524 B1 | 7/2014 |
| FR | 2989294 A1 | 10/2013 |
| JP | 5318756 A | 11/1994 |
| JP | 11197498 A | 7/1999 |
| JP | 11269683 A | 10/1999 |
| JP | 11330597 A | 11/1999 |
| JP | 11347758 A | 12/1999 |
| JP | 288503 A | 10/2005 |
| JP | 2005288503 A | 10/2005 |
| JP | 2006130691 A | 5/2006 |
| JP | 021548 A | 2/2007 |
| JP | 2007021548 A | 2/2007 |
| KR | 1120471 B1 | 3/2012 |
| WO | 9929243 A1 | 7/1999 |
| WO | 9963900 A1 | 12/1999 |
| WO | 2011025908 A1 | 3/2011 |
| WO | 2012006736 A2 | 1/2012 |
| WO | 2012108052 A1 | 8/2012 |
| WO | 2013022148 A1 | 2/2013 |
| WO | 2013138802 A1 | 9/2013 |
| WO | 2013153195 A1 | 10/2013 |
| WO | 2014079478 A1 | 5/2014 |
| WO | 2014079570 A1 | 5/2014 |
| WO | 2014111385 A1 | 7/2014 |

OTHER PUBLICATIONS

Patent Cooperation Treaty, International Search Report; Date of Mailing Jul. 14, 2015. pp. 1-6.

Abramov et al., "Laser separation of chemically strengthened glass"; Physics Procedia 5 (2010) 285-290, Elsevier.; doi: 10.1016/j.phpro.2010.08.054.

Arimoto et al., "Imaging properties of axicon in a scanning optical system"; Applied Optics, Nov. 1, 1992, vol. 31, No. 31, pp. 6653-6657.

"TruMicro 5000" Product Manual, Trumpf Laser GmbH + Co. KG, pp. 1-4, Aug. 2011.

Bhuyan et al., "High aspect ratio nanochannel machining using single shot femtosecond Bessel beams"; Applied Physics Letters 97, 081102 (2010); doi: 10.1063/1.3479419.

Bhuyan et al., "High aspect ratio taper-free microchannel fabrication using femtosecond Bessel beams"; Optics Express (2010) vol. 18, No. 2, pp. 566-574.

Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.

Cubeddu et al., "Compact tissue oximeter based on dual-wavelength multichannel time-resolved reflectance"; Applied Optics, vol. 38, No. 16, Jun. 1, 1999, pp. 3670-3680.

Ding et al., "High-resolution optical coherence tomography over a large depth range with an axicon lens"; Optic Letters, vol. 27, No. 4, pp. 243-245, Feb. 15, 2002, Optical Society of America.

"EagleEtch" Product Brochure, EuropeTec USA Inc., pp. 1-8, Aug. 1, 2014.

Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.

Glezer et al., "Ultrafast-laser driven micro-explosions in transparent materials"; Applied Physics Letters, vol. 71 (1997), pp. 882-884.

Golub, I., "Fresnel axicon"; Optic Letters, vol. 31, No. 12, Jun. 15, 2006, Optical Society of America, pp. 1890-1892.

Herman et al., "Laser micromachining of 'transparent' fused silica with 1-ps pulses and pulse trains"; Part of the SPIE Conference on Commerical and Biomedical Applications of Ultrafast Lasers, San Jose, CA (Jan. 1999), SPIE vol. 3616, 0277-786X/99, pp. 148-155.

Kosareva et al., "Formation of extended plasma channels in a condensed medium upon axicon focusing of a femotosecond laser pulse"; Quantum Electronics 35 (11) 1013-1014 (2005), Kvantovaya Elektronika and Turpion Ltd.; doi: 10.1070/QE2005v035n11ABEH013031.

Krüger et al., "Femtosecond-pulse visible laser processing of transparent materials"; Applied Surface Science 96-98 (1996) 430-438.

Krüger et al., "Laser micromachining of barium aluminium borosilicate glass with pluse durations between 20 fs and 3 ps"; Applied Surface Science 127-129 (1998) 892-898.

Krüger et al., "Structuring of dielectric and metallic materials with ultrashort laser pulses between 20 fs and 3 ps"; SPIE vol. 2991, 0277-786X/97, pp. 40-47.

Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/5003399900300.

Perry et al., "Ultrashort-pulse laser machining"; UCRL-JC-132159 Rev 1., Jan. 22, 1999, pp. 1-24.

Perry et al, "Ultrashort-pulse laser machining"; UCRL-ID-132159, Sep. 1998, pp. 1-38.

Perry et al., "Ultrashort-pulse laser machining of dielectric materials"; Journal of Applied Physics, vol. 85, No. 9, May 1, 1999, American Institute of Physics, pp. 6803-6810.

"PHAROS High-power femtosecond laser system" product brochure; Light Conversion, Vilnius, LT; Apr. 18, 2011, pp. 1-2.

Polynkin et al., "Extended filamentation with temporally chirped femtosecond Bessel-Gauss beams in air"; Optics Express, vol. 17, No. 2, Jan. 19, 2009, OSA, pp. 575-584.

Serafetinides et al., "Ultra-short pulsed laser ablation of polymers"; Applied Surface Science 180 (2001) 42-56.

(56) References Cited

OTHER PUBLICATIONS

Sundaram et al., "Inducing and probing non-thermal transitions in semiconductors using femtosecond laser pulses"; Nature Miracles, vol. 1, Dec. 2002, Nature Publishing Group (2002), pp. 217-224.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Yoshino et al., "Micromachining with a high repetition rate femtosecond fiber laser"; JLMN—Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.

\* cited by examiner

METHODS AND APPARATUSES FOR FABRICATING GLASS ARTICLES

CROSS-REFERENCE TO RELATED APPLICATIONS

This application claims the benefit of priority under 35 U.S.C. §119 of U.S. Provisional Application Ser. No. 62/024,093 filed on Jul. 14, 2014, the contents of which are relied upon and incorporated herein by reference in their entirety.

TECHNICAL FIELD

The present specification relates generally to the manufacture of glass articles and, more specifically, to the manufacture of glass articles by laser processing.

BACKGROUND

Historically, glass has been used as the preferred material for a wide variety of purposes, including packaging for foods, drinks, and pharmaceuticals because of its hermeticity, optical clarity, and excellent chemical durability relative to other materials. However, fast production of glass articles, such as glass containers, has been limited due to contamination of materials housed within glass articles by glass breakage involved in processing the glass articles. For example, a glass ribbon machine, such as that disclosed in U.S. Pat. No. 1,790,397, can form greater than 500 glass articles per minute. However, mechanical fracturing used to separate the glass articles from the remaining ribbon sometimes forms glass debris which may later contaminate the housed materials (i.e., foods, beverages, pharmaceuticals).

Accordingly, a need exists for alternative methods for forming glass articles and associated apparatuses to fabricate glass articles.

SUMMARY

The embodiments described herein relate to methods of fabricating formed glass articles. According to one embodiment, a method for fabricating a formed glass article may comprise forming a glass ribbon comprising a substantially planar topside and a substantially planar underside, and forming a parison comprising glass of the glass ribbon. The parison may be attached to the glass ribbon at an aperture formed in the glass ribbon and the parison may be hollow with an opening at the aperture of the glass ribbon and may extend from the underside of the glass ribbon. The process may also comprise shaping the parison to form a glass article. The glass article may be attached to the glass ribbon at an attachment region, the attachment region comprising the area proximate the edges of the aperture, and the attachment region defining an edge of the glass article. The process may also comprise contacting the attachment region with a focal line of a laser beam and separating the glass article from the glass ribbon at the attachment region. The attachment region may be perforated by the laser beam and the focal line may be substantially perpendicular to the plane of the glass ribbon.

In another embodiment, a glass ribbon machine may form glass articles. The glass ribbon machine may comprise rollers for forming a glass ribbon, a conveyor for conveying the glass ribbon, blowheads for forming parisons in the glass ribbon, paste molds for shaping the parisons into glass articles, and a laser separation system. The laser separation system may comprise a focal line of a laser beam, the focal line substantially perpendicular to a plane of the glass ribbon with sufficient intensity to perforate the glass ribbon.

In yet another embodiment, a method for fabricating a formed glass article may comprise forming a glass ribbon comprising a substantially planar topside and a substantially planar underside, and forming a parison comprising glass of the glass ribbon. The parison may be attached to the glass ribbon at an aperture formed in the glass ribbon and the parison may be hollow with an opening at the aperture of the glass ribbon and may extend from the underside of the glass ribbon. The process may also comprise shaping the parison to form a glass article. The glass article may be attached to the glass ribbon at an attachment region, the attachment region comprising the area proximate the edges of the aperture, and the attachment region defining an edge of the glass article. The process may also comprise contacting the attachment region with a focal line of a laser beam and separating the glass article from the glass ribbon at the attachment region. The attachment region may be perforated by the laser beam and the focal line may be substantially perpendicular to the plane of the glass ribbon. The laser beam may have a pulse duration between about 1 picosecond and about 100 picoseconds and may have a repetition rate of between about 1 kHz and 2 MHz. The glass article and the glass ribbon may be transparent to a wavelength of the laser beam.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
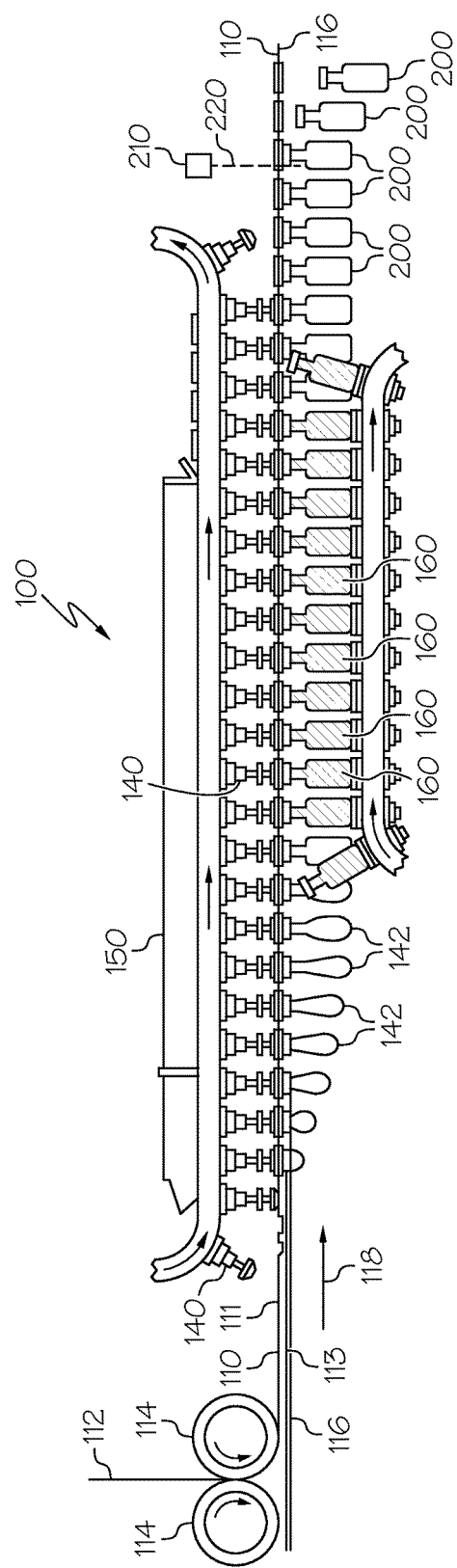
FIG. 1 schematically depicts a side view of a ribbon glass manufacturing apparatus, referred to herein as a glass ribbon machine, according to one or more embodiments shown and described herein.

Reference will now be made in detail to embodiments of apparatuses and methods for fabricating glass articles utilizing laser processing, examples of which are illustrated in the accompanying drawings. Whenever possible, the same reference numerals will be used throughout the drawings to refer to the same or like parts. One embodiment of an apparatus for fabricating glass articles is depicted in FIG. 1, which shows a glass ribbon machine which utilizes laser processing to separate glass articles attached to a glass ribbon. Generally, a glass ribbon machine may produce shaped glass articles which are attached to the glass ribbon following forming steps which shape the glass article. For example, the glass ribbon machine may produce glass containers that are substantially hollow and are attached to the glass ribbon at the opening of the container corresponding to an aperture in the glass ribbon. To complete fabrication of the glass articles, the glass articles are separated from the glass ribbon. In one embodiment, the glass articles are separated from the glass ribbon through contact with a laser beam in the attachment region of the glass article and the glass ribbon, which may be referred to herein as laser processing. Laser processing may alone, or with other manufacturing steps, be utilized to cut the glass in the attachment region of the glass article and the glass ribbon, thereby separating the glass article from the glass ribbon. The laser processing may include contacting the glass ribbon with attached glass article with a focal line of a laser beam, where the focal line is substantially perpendicular to the plane of the glass ribbon. For example, the focal line may trace a closed loop around the opening of the glass article corresponding to the outer edge of the mouth of the separated glass article.

Utilizing laser processing to separate the glass articles from the glass ribbon may result in substantially reduced debris (i.e., glass shards, particles, fragments, etc.) in terms of the size of the debris as well as total amount of debris. Additionally, the entire glass fabrication process may be carried out at relatively low temperatures with no need to expose the glass articles to high forming temperatures during shaping, which may impart enhanced durability to the glass articles when contacted by materials stored within the glass articles. Various embodiments of methods and apparatuses for fabricating glass articles will be described herein with specific references to the appended claims.

Referring to FIG. 1, a glass ribbon machine 100 is schematically depicted. Generally, a glass ribbon 110 is formed by rollers 114 and is transported on a conveyor 116 in a process direction 118 (left to right in FIG. 1). Glass 112 is melted prior to contacting the rollers 114 which reshape the glass 112 into a glass ribbon 110. The glass ribbon 110 generally has a length in the process direction 118 and a thickness (as determined by the area between the rollers 114) which is much less than the length. The thickness is defined as the distance between the topside 111 and the underside 113 of the glass ribbon 110. The topside 111 and the underside 113 of the glass ribbon 110 are substantially planar. As the glass ribbon 110 moves in the processing direction, more hot glass 112 is molded to form the glass ribbon 110 such that the glass ribbon 110 is continuously created as existing sections of the glass ribbon 110 are moved along the process direction 118. The glass ribbon 110 may rest on the conveyor 116 while the conveyor 116 moves in the process direction 118 and carries the glass ribbon 110 in the process direction 118. In one embodiment, the conveyor 116 comprises a chain and has holes which are at least the size of the diameter of the glass article 200. However, the conveyor 116 may be any mechanical device suitable for moving the glass ribbon 110 along the process direction 118.

The glass utilized to form the glass ribbon 110, which will ultimately be the material of the glass article 200, may be any glass suitable for forming into the desired shape of the glass article 200. For example, the glass may be aluminosilicate glass, such as alkali aluminosilicate or alkaline earth aluminosilicate glass. In one embodiment, the glass may be ion-exchangeable, such that the glass composition can undergo ion-exchange for mechanical strengthening following formation of the glass article 200. In embodiments, the glass composition may be a 'Type 1a' or a 'Type 1b' glass compositions as defined by the ASTM standard E438.92. In some embodiments, Type 1a and Type 1b glasses have suitable chemical durability for use in pharmaceutical applications. In embodiments, the glass composition may include greater than about 1.0 mol. % boron and/or compounds containing boron, including, without limitation, $B_2O_3$. In other embodiments, the glass compositions from which the glass articles are formed includes less than or equal to about 1.0 mol. % of oxides of boron and/or compounds containing boron. In some of these embodiments, the concentration of oxides of boron and/or compounds containing boron in the glass composition may be less than or equal to about 0.5 mol. %, less than or equal to about 0.4 mol. %, or even less than or equal to about 0.3 mol. %. In some of these embodiments, the concentration of oxides of boron and/or compounds containing boron in the glass composition may be less than or equal to about 0.2 mol. %, or even less than or equal to about 0.1 mol. %. In some other embodiments, the glass composition is substantially free from boron and compounds containing boron.

The glass ribbon 110 is carried in the process direction 118 and a parisons 142 is formed by the blowhead 140. The blowhead 140 may travel at approximately the same speed as the glass ribbon 110 in the process direction 118 and make contact with the topside 111 of the glass ribbon 110. The blowhead 140 blows gas, such as air, into the glass ribbon 110 and forms a parison 142 which moves along with the glass ribbon 110 in the process direction 118. As used herein, a "parisons" refers to the underhanging glass which is formed from a portion of the glass ribbon 110 by a mechanical force, such as, without limitation, gas blown by the blowhead 140 positioned above the glass ribbon 110. The parison 142 hangs from the glass ribbon 110 and is elongated at least in part by the gas blown from the blowhead 140. The parison 142 is shaped primarily by the gas from the blowhead 140 and gravity. The parison 142 may be hollow and may be joined to the glass ribbon 110 at an aperture in the glass ribbon 110 formed by the blowhead 140.

Thereafter, the parison 142 is shaped into the glass article 200. In one embodiment, the parison 142 is encapsulated by a paste mold 160 which is moved into alignment with the parison 142. The paste mold 160 may have two sides which come together to enclose the parison 142. In embodiments, the paste mold 160 moves in the process direction 118 at the same speed as the conveyor 116 moving the glass ribbon 110, and is generally aligned with the blowheads 140 which formed the parisons 142. The paste mold 160 has an inner shape which corresponds with the outer shape of the glass article 200 to be formed. When the paste mold 160 is positioned around the parison 142, the blowhead 140 continues to blow gas into the parison 142 and the parison 142 expands so that it fills the inner shape of the paste mold 160, thus forming the desired shape of the glass article 200. The parison 142 expands within the paste mold 160 to contact the inner walls of the paste mold, and the area occupied by gas within the parison 142 forms the hollow interior 202 of the glass article (shown in FIG. 3). Thus, the parison 142 is shaped and transformed into the glass article 200 inside of the paste mold 160. In embodiments, the glass article 200 may have walls 201 which are contoured on their outer edge to the shape of the paste mold and have a relatively even thickness around the entire area of the walls 201.

As shown in FIG. 1, a plurality of blowheads 140 and paste molds 160 are continuously cycled into contact with the continuous glass ribbon 110. As such, the blowheads 140, paste molds 160, and conveyor 116 moving the glass ribbon 110 all move at about the same speed.

Paste molds 160 with a variety of contoured shapes may be utilized to create glass articles 200 having a wide variety of shapes and sizes. While the glass article 200 is depicted in FIG. 1 as having the shape of a container (i.e., a vial), it should be understood that the glass article 200 may have other shape forms, including, without limitation, cartridges, syringes, syringe barrels, vacutainers, ampoules, bottles, flasks, phials, tubes, beakers, bulbs, bowls, canisters, capsules, jars, tanks, or the like.

After the parison 142 is blown into the shape of the glass article 200, the paste mold 160 opens and is withdrawn from the formed glass article 200 which hangs from the glass ribbon 110. Once the paste mold 160 is removed, the shape and size of the glass article 200 are that of the final glass article 200 which will be separated from the glass ribbon 110. The blowhead 140 is then withdrawn from the glass ribbon 110, leaving only the glass ribbon 110 and attached glass article 200. The glass ribbon 110 and glass article 200 continue to be moved by the conveyor 116 in the process direction 118. The glass article 200 then cools to a hard, solid state. The cooling can be gradual by exposure to ambient conditions or may be a forced cooling process.

Figure 2:
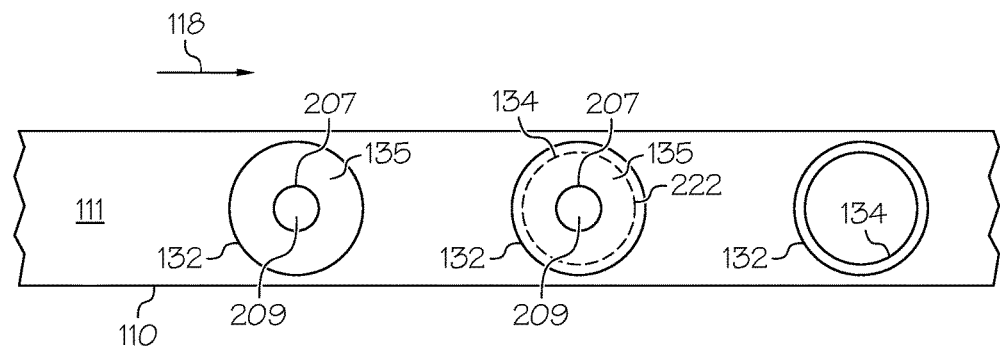
FIG. 2 schematically depicts a top view of a glass ribbon during the manufacture of glass articles, according to one or more embodiments shown and described herein.
Figure 3:
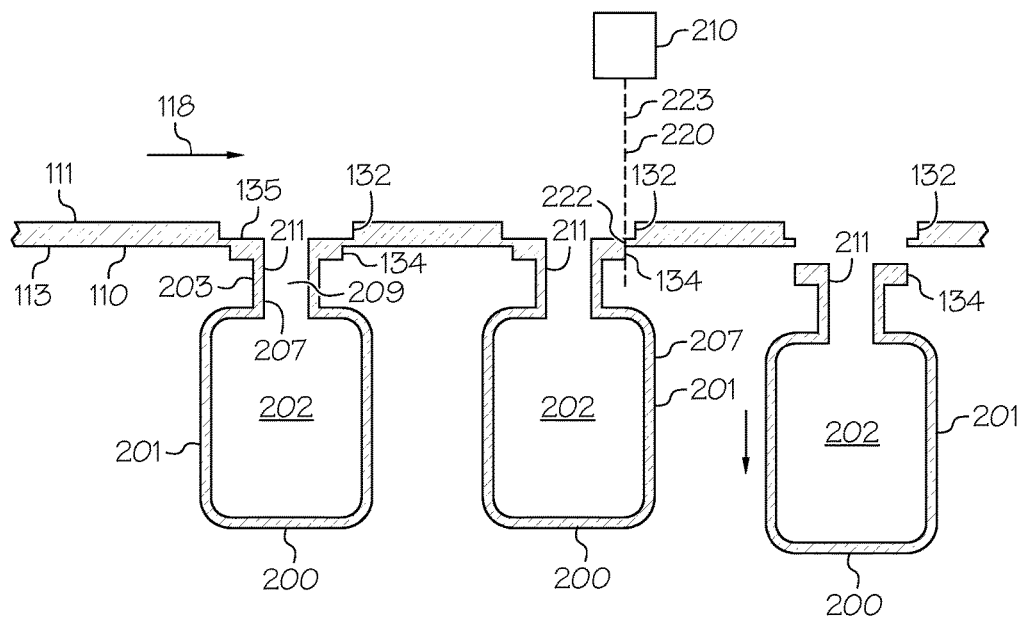
FIG. 3 schematically depicts a cross-sectional side view of a glass ribbon and glass articles during the manufacture of glass articles, according to one or more embodiments shown and described herein.

Referring now to FIGS. 2 and 3, the glass ribbon 110 and glass articles 200 are depicted following the release of the blowheads 140 and the paste molds 160 (in the region to the right in FIG. 1). Generally, following shaping by the paste mold 160, the glass article 200 is suspended from the underside 113 of the glass ribbon 110 at the attachment region 222. The attachment region 222 defines the boundary between the remaining glass ribbon 110 and the glass article 200 after it is separated from the glass ribbon 110 (the portion of the edge of the glass article 200). In one embodiment, the formed glass article 200 is a substantially hollow container comprising an opening 209. The opening 209 defines an aperture in the glass ribbon 110, which was initially created by the blowhead 140 by the gas directed into the glass ribbon 110 to create the parison 142.

In one embodiment, the glass article comprises walls 201 which surround the interior 202 of the glass article 200 (the hollow area of the container). The mouth 211 of the glass article 200 is defined by the opening 209 of the glass article 200, which is an aperture in the glass ribbon 110. The mouth 211 may be proximate the attachment region 222 of the glass article 200 and the glass ribbon 110. The attachment region 222 may comprise the area adjacent the edges of the aperture in the glass ribbon 110 (defined by the opening 209). For example, the attachment region 222 may be cylindrically shaped and defines an outer edge 134 of a mouth 211 of the glass article 200. The attachment region 222 may have a diameter larger than the opening 209 and surround the opening 209, such that the mouth 211 of the glass article 200 is formed when the glass article 200 is separated from the glass ribbon 110. In one embodiment, the glass ribbon 110 may have a depression in its top side 111 caused by contact with the blowhead 140, the depression defined by the depression side edge 132 (which may be circularly shaped as shown in FIGS. 2 and 3) and depression bottom edge 135. The attachment region 222 may be between the depression side edge 132 and the opening 209. The depression bottom edge 135 may define at least a portion of the top of the mouth 211 of the glass article 200.

In the embodiments described herein, the glass article 200 is separated from the glass ribbon 110 at the attachment region 222 by contacting the attachment region with a laser beam 220, sometimes referred to herein as laser processing. The laser beam and accompanying mechanisms which may affect its movement, focus, and path are collectively referred to herein as a laser separation system. Contacting the attachment region 222 with the laser beam 220 may alone, or with other manufacturing steps, be utilized to cut the glass article 200 out from the glass ribbon 110, separating the glass ribbon 110 from the glass article 200.

Contact with the laser beam 220 may cause the cutting, perforating, ablating, or otherwise alter the mechanical integrity of the attachment region 222. Generally, the laser beam 220 must have a certain intensity at a particular area of the attachment region 222 to alter the mechanical integrity of the attachment region 222. The laser beam 220 is operable to create small (micron and smaller) "holes" in the attachment region 222 for the purpose of drilling, cutting, separating, perforating, or otherwise processing the attached glass ribbon 110 and glass article 200. More particularly, an ultrashort (i.e., from $10^{-10}$ to $10^{-15}$ second) pulse laser beam 220 having wavelengths such as 1064 nm, 532 nm, 355 nm, or 266 nm is focused, shown as the focal line 223 of the laser beam 220, to an energy density above the threshold needed to create a defect in the attachment region 222. The laser beam 220 may have a repetition rate in a range of between about 1 kHz and 4 MHz, or between 1 kHz and 2 MHz, or in another embodiment, between about 10 kHz and about 650 kHz. By repeating the process, a series of laser-induced defects aligned along a predetermined path (i.e., the attachment region 222) are created in the attached glass ribbon 110 and glass article 200. By spacing the laser-induced features sufficiently close together, a controlled region of mechanical weakness within the attachment region 222 is created and the attachment region 222 can be precisely fractured or separated (mechanically or thermally) along the path defined by the series of laser-induced defects (shown in FIGS. 2 and 3 as the dotted line representing the attachment region 222). The ultrashort laser pulse(s) may be optionally followed by a carbon dioxide ($CO_2$) laser or other source of thermal stress to effect fully automated separation of the glass article 200 from the glass ribbon 110. Representative laser systems which can be applied to separate the glass article 200 from the glass ribbon 110, are described in detail in U.S. Patent Application 61/752,489, Titled "ARRANGEMENT AND METHOD FOR LASER-BASED PROCESSING OF FLAT SUBSTRATES (GLASS CUTTING), the teachings of which are incorporated herein by reference in their entirety.

The wavelength of the laser beam 220 may be selected so that the material to be laser processed (i.e., the attachment region 222) is transparent to the wavelength of the laser. The selection of the laser source may also depend on the ability to induce multi-photon absorption (MPA) in the attachment region 222.

Perforations in the attachment region 222 can be accomplished with a single "burst" of high energy, short duration pulses spaced close together in time. The laser pulse duration may be $10^{-10}$ s or less, or $10^{-11}$ s or less, or $10^{-12}$ s or less, or $10^{-13}$ s or less. For example, the laser pulse duration may be between about 1 picosecond and about 100 picoseconds, or in another embodiment, between about 5 picoseconds and about 20 picoseconds (e.g., ~10 psec). These "bursts" may be repeated at high repetition rates (e.g. kHz or MHz). Each "burst" may contain multiple pulses (such as two pulses, three pulses, four pulses, five pulses, 10 pulses, 15 pulses, 20 pulses, 25 pulses or more). The time between each "burst" will be much longer, often about 10 μsec, for a laser repetition rate of about 100 kHz. In some embodiments the burst repetition frequency is in a range of between about 1 kHz and about 200 kHz. The exact timings, pulse durations, and repetition rates can vary depending on the laser design, but short pulses (i.e., less than about 15 psec) of high intensity have been shown to work well with this technique. (Bursting or producing pulse bursts is a type of laser operation where the emission of pulses is not in a uniform and steady stream but rather in tight clusters of pulses.)

The perforations may be spaced apart and precisely positioned by controlling the velocity of the attachment region relative to the laser through control of the motion of the laser and/or the attachment region (i.e., the motion of the glass ribbon 110 in the process direction 118). In one embodiment, in a single pass, a laser can be used to create a highly controlled full line perforation through the attachment region 222, with extremely little (less than about 75 μm, or even less than about 50 μm) subsurface damage and debris generation. This is in contrast to the typical use of spot-focused lasers to ablate material, where multiple passes are often necessary to completely perforate the glass thickness, and where large amounts of debris are generated from the ablation process, and more extensive sub-surface damage (less than about 100 μm) and edge chipping occur.

Thus, it is possible to create a microscopic (i.e., less than about 0.5 μm, or even less than about 100 nm in diameter) elongated "hole" (also called a perforation or a defect line) in the attachment region 222 using a single high energy burst pulse. These individual perforations can be created at rates of several hundred kilohertz (several hundred thousand perforations per second, for example). Thus, with relative motion between the attachment region 222 and the laser beam 220, these perforations can be placed adjacent to one another (spatial separation varying from sub-micron to several microns as desired). This spatial separation is selected in order to facilitate cutting. For example, the perforations or damage tracks may be spaced apart separated from each other by 1 to 25 microns, in some embodiments the spacing is preferably 3 microns or larger—for example 3-12 microns, or for example 5-10 microns, or 10-20 microns. The laser beam 220 may be, for example a Bessel beam.

For example, to achieve a linear cutting speed of 300 mm/sec, 3 micron hole pitch corresponds to a pulse burst laser with at least 100 kHz burst repetition rate. For a 600 mm/sec cutting speed, a 3 micron pitch corresponds to a burst-pulsed laser with at least 200 kHz burst repetition rate. A pulse burst laser that produces at least 40 μJ/burst at 200 kHz, and cuts at a 600 mm/s cutting speed needs to have laser power of at least 8 Watts. Higher cut speeds therefore require even higher laser powers.

For example, to perforate glass at a 0.4 msec perforations speed at 3 μm pitch (3 micron spacing between the perforations) and 40 μJ/burst would require at least a 5 Watt laser, a 0.5 msec cut speed at 3 μm pitch and 40 μJ/burst would require at least a 6 Watt laser. Thus, preferably the laser power of the pulse burst ps laser is 6 watts or higher, more preferably at least 8 Watts or higher, and even more preferably at least 10 W or higher. For example in order to achieve a 0.4 msec cut speed at 4 μm pitch (defect lines pacing, or between damage tracks spacing) and 100 μJ/burst one would require at least a 10 Watt laser, and to achieve a 0.5 msec cut speed at 4 μm pitch and 100 μJ/burst one would require at least a 12 Watt laser. For example, to achieve a cut speed of 1 m/sec at 3 μm pitch and 40 μJ/burst one would require at least a 13 Watt laser. Also for example 1 m/sec cut speed at 4 μm pitch and 400 μJ/burst would require at least a 100 Watt laser. The optimal pitch between damage tracks and the exact burst energy is material dependent, and can be determined empirically. Too long a pitch (>50 μm, and in some glasses >25 μm) may result in "uncontrolled microcracking"—i.e., where instead of propagating from hole to hole the microcracks propagate along a different path, and cause the glass to crack in a different (undesirable) direction. This may ultimately lower the strength of the separated glass part, since the residual microcracks will acts as flaws which weaken the glass. Too high a burst energy (e.g., >2500 μJ/burst, and in some embodiments >500 μJ/burst) used to form each perforation can cause "healing" or re-melting of already formed microcracks of adjacent perforations, which will inhibit separation of the glass. Accordingly, at least on some embodiments, it is preferred that burst energy be <2500 μJ/burst, for example, ≤500 μJ/burst. Also, using a burst energy that is too high can cause formation of microcracks that are extremely large and create flaws which reduce the edge strength of the parts after separation. Too low a burst energy (<40 μJ/burst) may result in no appreciable damage track formed within some of the glasses, and hence very high separation strength or complete inability to separate along the perforated contour. In some embodiments the pulsed laser has laser power of 10 W-100 W.

According to some embodiments volumetric pulse energy densities may be within the 0.01-0.6 μJ/μm$^3$. It has been discovered that much higher (5 to 10 times higher) volumetric pulse energy density (μj/μm$^3$) is required for perforating alkaline some glasses as compared to that for glasses such as Corning Gorilla®. This can be achieved, for example, by utilizing pulse burst lasers, preferably with at least 2 pulses per burst and providing volumetric energy densities within the alkaline earth boro-aluminosilicate glasses (with low or no alkali) of about 0.05 μJ/μm$^3$ or higher, e.g., at least 0.1 μJ/μm$^3$, for example 0.1-0.5 μJ/μm$^3$. For other glasses, volumetric energy densities may be within the 0.01-0.1 μJ/μm$^3$ range, or 0.05-0.1 μJ/μm$^3$. Accordingly, it is preferable that the laser produces pulse bursts with at least 2 pulses per burst. For example, in some embodiments the pulsed laser has laser power of 10 W-150 W (e.g., 10-100 W) and produces pulse bursts with at least 2 pulses per burst (e.g., 2-25 pulses per burst). In some embodiments the pulsed laser has the power of 25 W-60 W, and produces pulse bursts with at least 2-25 pulses per burst, and periodicity or distance between the adjacent defect lines or perforations produced by the laser bursts is 2-10 microns.

In one embodiment, the laser beam 220 comprises a focal area, such as a focal line 223, which has a defined length and has an intensity sufficient to materially alter the attachment region (i.e., perforate or cut). To form a focal line 223, a laser may be transmitted through an optical assembly. Suitable optical assemblies which can be applied to generate the focal line 223, as well as a representative optical setup in which these optical assemblies can be applied, are described in detail in U.S. Patent Application 61/917,092, Titled "STACKED TRANSPARENT MATERIAL CUTTING WITH ULTRAFAST LASER BEAM OPTICS, DISRUPTIVE LAYERS AND OTHER LAYERS, the teachings of which are incorporated herein by reference in their entirety. For example, an optical assembly positioned in the beam path of a laser beam is configured to transform the laser beam into a focal line 182, which along the beam propagation direction, the laser beam focal line 223 may have a length in a range of between 0.1 mm and 100 mm. For example, as shown in FIG. 3, the laser beam 220 comprises a focal line 223 of a defined length which contacts the attachment region 222.

As shown in FIGS. 2 and 3, the focal area, such as the focal line 223, of the laser beam 220 may be substantially perpendicular to the plane of the glass ribbon 110. The focal line 223 may be incident on the attachment region 222 on the topside 111 of the glass ribbon 110. For example, in one embodiment, the glass ribbon 110 may move in the process direction 118 at a velocity, such as at least about 1 m/s, and the focal line 223 of the laser beam 220 may move in a path and contact the attachment region 222 and perforate the attachment region 222. For example, the focal area may move in a circular direction relative to the glass ribbon 110 and a closed loop may be formed by the focal line 223, as shown in FIG. 2 as the circle representing the attachment region 222. The focal line 223 and the glass ribbon 110 may be in motion while laser processing occurs. However, in other embodiments, the glass ribbon 110 or the focal line 223 may be stationary. In one embodiment, the movement of the focal line 223 may be controlled by a galvo mirror, MEMS mirror, or a similar scanning mirror 210.

Figure 4:
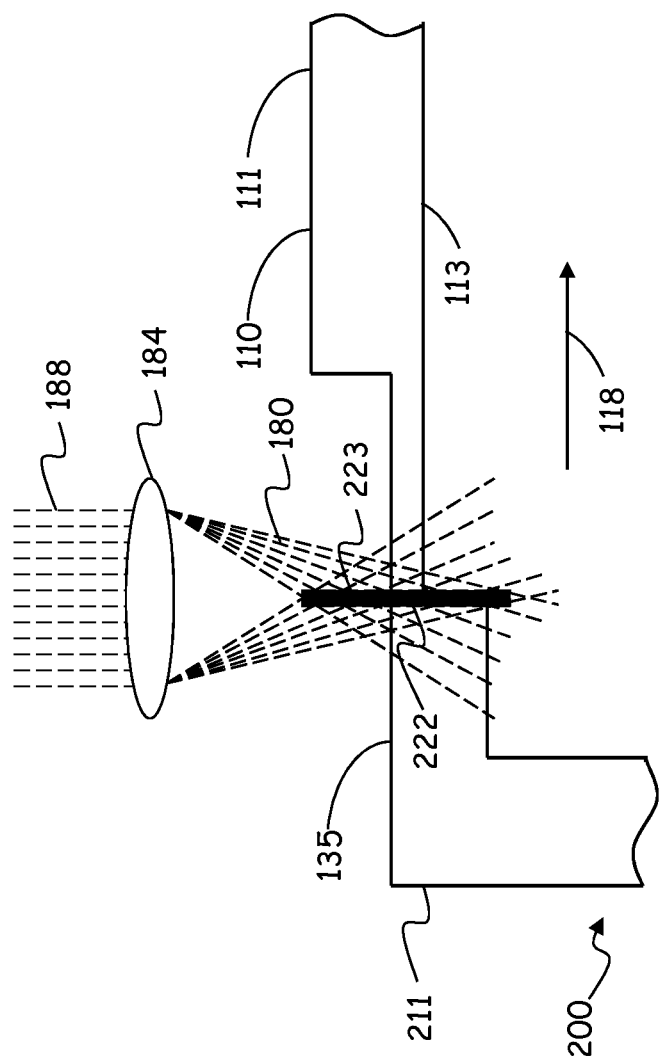
FIG. 4 schematically depicts a cross sectional side view of the glass ribbon and glass article being laser processed, according to one or more embodiments shown and described herein.
Figure 5:
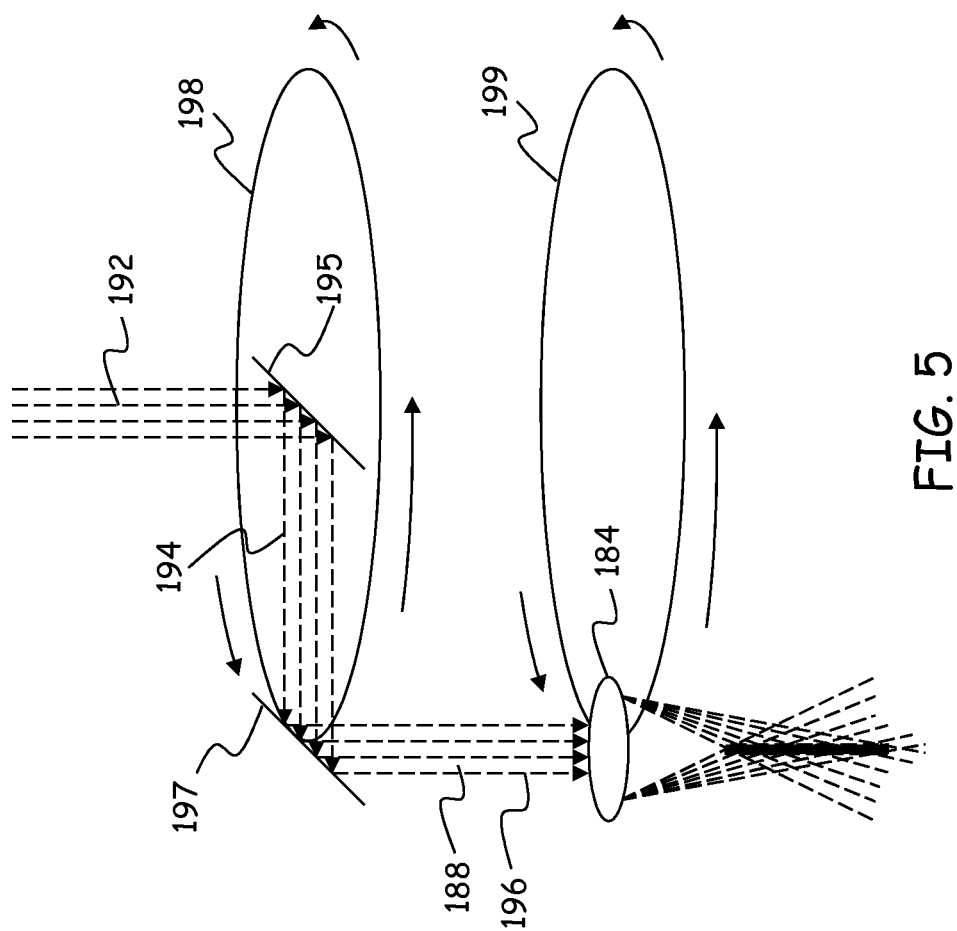
FIG. 5 schematically depicts a spinning mirror apparatus for directing a laser beam, according to one or more embodiments shown and described herein.

Now referring to FIGS. 4 and 5, in one embodiment, a plurality of mirrors may be utilized to move the laser beam 220 in the desired direction to contact the attachment region 222. In one embodiment, the source laser 188 may be reflected by one or more moving mirrors 195,197. The first portion 192 of the source laser 188 may be directed in a downward direction (perpendicular to the glass ribbon 110) and be reflected by a first mirror 195 to form a second portion 194 of the source laser 188 which is directed horizontally. The second portion 194 of the source laser 188 may be reflected by a second mirror 197 to form a third portion 196 of the source laser 188 which is directed downward and which is incident on the optical assembly 184. The first mirror 195 may spin around an axis that is at the point of incidence of the first portion 192 of the source laser 188. As such, the second portion 194 emanates from the first mirror 195 and spins to contact the path of circle 198. The second mirror 197 moves in a circular path around the path of circle 198 to continuously reflect the spinning second portion 194. The optical assembly 184 moves around the path of circle 199 at the same rate as the second mirror 197 and directly below the second mirror 197 such that the third portion 196 is continuously incident upon the optical assembly 184. In this arrangement, the third portion 196 may from a cylindrical shape in its movement and may translate into a cylindrical shape for the movement of the laser transferred through the optical assembly 184. In another embodiment, the optical assembly could be positioned on the first portion 192 and a focused area of a laser beam could be directed by one or more mirrors. The circular path of the laser beam 220 which contacts the attachment region 222 can be used to cut a rounded shape for the outer edge 134 of the mouth 211. Additionally, when incorporated into the ribbon machine 100, the source laser 188 can be manipulated to form a circle, but also can move in the process direction 118 to follow the movement of the glass ribbon 110.

In one embodiment, the focal area, such as the focal line 223 of the laser beam 220 has a length sufficient to contact only the attachment region 222. For example, the focal line 223 may have a length such that it is no incident on other sections of the glass article 200, such as the body 207 of the glass article 200. For example, the body 207 of the glass article 200 may have a larger diameter than an outer edge 134 of the mouth 211 of the glass article 200. In such a configuration, if the focal line 223 extended indefinitely, the focal line 223 would contact the body 207 of the glass article 200, possibly cutting the body 207.

Following the contact by the laser beam 220, the glass article 200 may spontaneously separate from the glass ribbon 110, and may fall from the glass ribbon 110 as shown in FIG. 3. In other embodiments, the separation may be caused by an additional thermal treatment or additional laser treatment. In one embodiment, the separation may occur spontaneously immediately after the attachment region 222 is perforated by contact with the laser beam 220. Such separation may be caused by the mechanical stresses that are present in the glass. For example, some glasses having a relatively high coefficient of thermal expansion create higher stressing at the perforated area causing a continuous fracture line and spontaneous separation. In another embodiment, the separation may be caused by cooling the attachment region 222 following perforation. For example, the glass in the attachment region 222 may be cooled by a black body which absorbs radiation or by blowing cool air or other gas on or near the attachment region 222. In another embodiment, adding air pressure to the top of the glass article following perforation may contribute to separation. For example, a second series of blowhead could blow air onto the topside 111 of the glass ribbon 110. As such, air may be blown downward and the force of the blown air may cause separation. In another embodiment, a mechanical force could pull downward on the glass article 200 following perforation to cause separation. For example, a vacuum could pull on the bottom of the glass article 200 or a mechanical apparatus could attached to the glass article 200 and pull it downward.

FIG. 4 schematically depicts an embodiment of a focused laser which forms a focal line 182 having sufficient intensity to perforate and/or cut the attachment region 222. To form a focal line 182 in the laser beam 220 incident on the attachment region 222, a source laser 188 may be transmitted through an optical assembly 184. For example, an optical assembly 184 positioned in the beam path of the source laser 188 is configured to transform the source laser 188 into a focal line 223, viewed along the beam propagation direction, the laser beam focal line 223 having a length in a range of between 0.1 mm and 100 mm. For example, as shown in FIG. 4, a spherical or disc shaped optical assembly 184 may be utilized to focus the source laser 188 and form a focal line 223 of a defined length. A mirror is not shown in FIG. 4, but may be incorporated to change the position of the source laser 188 and or optical assembly 184 while maintaining the generally vertical arrangement of the focal line 223. The focal line 223, according to at least some embodiments, is a Bessel beam focal line.

The methods and apparatuses for forming glass articles 200 described herein may be particularly well suited for forming glass articles 200 that act as containers for pharmaceuticals, foods, beverages, and other consumable materials. In one embodiment, the glass articles 200 are substantially free of debris formed during the separation of the glass articles 200 from the glass ribbon 110. In the case of glass debris from glass cutting, consumption by, for example, ingestion or injection of glass mixed with the materials stored within the container (i.e., pharmaceuticals, foods, and/or drinks) may be unhealthy to a user.

Conventional glass ribbon machines may separate glass articles 200 from their attached glass ribbons 110 by a mechanical process. Such a process may create glass chips of greater than about 200 micron. However, the laser processing methods and apparatus described herein may separate the glass articles 200 from the glass ribbon 110 without forming glass chips or other debris of greater than 200 microns. For example, in various embodiments, the debris from laser processing may be small is size, such as less than about 200 microns, less than about 100 microns, less than about 50 microns, less than about 25 microns, or even less than about 10 microns. As used herein, glass debris is measured as the longest length in any direction of any single piece of debris formed.

Without being bound by theory, it is believed that the mold forming process described herein may allow for lower temperatures to be used in glass article forming, and as such, may reduce propensity for glass delamination in the glass articles described herein. Specifically, some glass articles for containing pharmaceutical or other compositions are generally formed from glass compositions which are known to exhibit chemical durability and low thermal expansion, such as alkali borosilicate glasses. While alkali borosilicate glasses exhibit good chemical durability, container manufacturers have observed silica-rich glass flakes dispersed in the solution contained in the glass containers. This phenomenon is referred to as delamination. Delamination occurs particularly when the solution has been stored in direct contact with the glass surface for long time periods (months to years). Accordingly, a glass which exhibits good chemical durability may not necessarily be resistant to delamination.

It has been hypothesized that delamination is due to the phase separation which occurs in alkali borosilicate glasses when the glass is exposed to the relatively high temperatures used for reforming the glass into a container shape during conventional forming processes. Additionally, it is believed that the delamination of the silica-rich glass flakes from the interior surfaces of the glass containers is due to the compositional characteristics of the glass container in its as-formed condition. Specifically, the high silica content of alkali borosilicate glasses causes the glass to have relatively high melting and forming temperatures for conventional forming procedures. However, the alkali and borate components in the glass composition melt and/or vaporize at much lower temperatures. In particular, the borate species in the glass are highly volatile and evaporate from the surface of the glass at the high temperatures necessary to form and reform the glass using conventional methods.

Specifically, in some processes glass stock is reformed into glass containers at high temperatures and causes more volatile borate species to evaporate from portions of the surface of the glass. When this evaporation occurs within the interior volume of the glass container, the volatilized borate species are re-deposited in other areas of the glass container surface causing compositional heterogeneities in the glass container surface, particularly with respect to the near-surface regions of the interior of the glass container (i.e., those regions at or directly adjacent to the interior surfaces of the glass container). However, it has been found that the ribbon machine process described herein may be utilized at low temperatures for glass forming, and therefore boron may not be substantially volatilized.

In view of the present disclosure, it should be understood that glass articles described herein, such as glass containers, may be fabricated at a rapid pace by a glass ribbon machine with reduced debris. Such glass articles may have desirable properties for many purposes, including storage of pharmaceutical compositions.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A method of fabricating a formed glass article, the method comprising:
   forming a glass ribbon comprising a substantially planar topside and a substantially planar underside;
   forming a parison comprising glass of the glass ribbon, the parison attached to the glass ribbon at an aperture formed in the glass ribbon, wherein the parison is hollow with an opening at the aperture of the glass ribbon and extends from the underside of the glass ribbon;
   shaping the parison to form a glass article, the glass article attached to the glass ribbon at an attachment region, the attachment region comprising an area proximate the edges of the aperture, the attachment region defining an edge of the glass article; and
   contacting the attachment region with a focal line of a laser beam such that the attachment region is perforated by the laser beam, wherein the focal line is substantially perpendicular to a plane of the glass ribbon and the contacting causes the spontaneous separation of the glass article from the glass ribbon at the attachment region.

2. The method of claim 1, wherein the formed glass article is a substantially hollow container comprising an opening, wherein the opening was the aperture in the glass ribbon.

3. The method of claim 1, wherein the attachment region is cylindrically shaped and defines an outer edge of a mouth of the glass article.

4. The method of claim 1, further comprising conveying the glass ribbon in a process direction, wherein the contacting occurs while the attached glass ribbon and glass article are conveyed at a velocity of at least about 1 m/s.

5. The method of claim 1, wherein the glass ribbon comprises a plurality of formed glass articles attached thereto prior to separating the glass articles from the glass ribbon.

6. The method of claim 1, wherein the formed glass article is a container and a mouth of the container is proximate the attachment region of the glass article and the glass ribbon.

7. The method of claim 1, further comprising forming the glass ribbon with at least one roller.

8. The method of claim 1, wherein the laser beam has a pulse duration between about 1 picosecond and about 100 picoseconds.

9. The method of claim 1, wherein the laser beam has a repetition rate of between about 1 kHz and 2 MHz.

10. The method of claim 1, wherein the glass article and the glass ribbon are transparent to a wavelength of the laser beam.

11. The method of claim 1, wherein the focal line of the laser beam has a length sufficient to contact only the attachment region.

12. The method of claim 11, wherein a body of the glass article has a diameter larger than an outer edge of a mouth of the glass article.

13. The method of claim 1, wherein the glass ribbon and the focal line of the laser beam are in motion while the laser contacts the attachment region.

14. The method of claim 1, wherein the method does not form glass chips or other debris of greater than about 200 microns.

15. The method of claim 1, wherein the focal line of the laser beam moves in a circular direction relative to the glass ribbon.

16. The method according to claim 1, wherein the laser beam has a repetition rate of between about 1 kHz and 2 MHz.

17. The method to claim 1, wherein the laser beam has a repetition rate of between about 1 kHz and 2 MHz, and contains 2-25 pules per burst.

18. The method according to claim 1, wherein the laser beam is contacting the attachment region with a focal line of a laser beam such that the attachment region is perforated by the laser beam, forming multiple perforations separated from each other by 1 to 25 microns.

19. A method of fabricating a formed glass article, the method comprising:
    forming a glass ribbon comprising a substantially planar topside and a substantially planar underside;
    forming a parison comprising glass of the glass ribbon, the parison attached to the glass ribbon at an aperture formed in the glass ribbon, wherein the parison is hollow with an opening at the aperture of the glass ribbon and extends from the underside of the glass ribbon;
    shaping the parison to form a glass article, the glass article attached to the glass ribbon at an attachment region, the attachment region comprising an area proximate the edges of the aperture, the attachment region defining an edge of the glass article; and
    contacting the attachment region with a focal line of a laser beam such that the attachment region is perforated by the laser beam, wherein the contacting causes the spontaneous separation of the glass article from the glass ribbon at the attachment region and:
    the focal line is substantially perpendicular to a plane of the glass ribbon;
    the laser beam has a pulse duration between about 1 picosecond and about 100 picoseconds;
    the laser beam has a repetition rate of between about 1 kHz and 2 MHz; and
    the glass article and the glass ribbon are transparent to a wavelength of the laser beam.

20. A method of fabricating a formed glass article, the method comprising:
    forming a glass ribbon comprising a substantially planar topside and a substantially planar underside;
    forming a parison comprising glass of the glass ribbon, the parison attached to the glass ribbon at an aperture formed in the glass ribbon, wherein the parison is hollow with an opening at the aperture of the glass ribbon and extends from the underside of the glass ribbon;
    shaping the parison to form a glass article, the glass article attached to the glass ribbon at an attachment region, the attachment region comprising an area proximate the edges of the aperture, the attachment region defining an edge of the glass article;
    contacting the attachment region with a focal line of a laser beam such that the attachment region is perforated by the laser beam, wherein the focal line is substantially perpendicular to a plane of the glass ribbon; and
    cooling the attachment region after contacting the attachment region with a focal line of the laser beam, wherein the cooling causes separation of the glass article from the glass ribbon at the attachment region.

21. The method of claim 20, wherein the cooling comprises directing a gas onto the attachment region.

22. The method of claim 20, wherein the cooling comprises absorbing radiation from the attachment region with a black body.

* * * * *